(12) United States Patent
Blank et al.

(10) Patent No.: X5829
(45) Date of Patent: Feb. 16, 1830

(54) PAPER, LEATHER

(76) Inventors: Ephraim Blank; Thomas Blank

Ephraim F. Blank, and Thomas Blank
Letters Patent.

The Schedule referred to in these Letters Patent and making part of the same, containing a description, in the words of the said Ephraim F. and Thomas Blank, themselves of their improvement in the manufacture of a composition, which they denominate a Patent Leather Paper This new and valuable invention or discovery consists of the art of making a paper from the refuse parings or shavings, of leather, which is peculiarly, and durably fitted for sheathing Vessels; and which is believed to be superior to the sheathing paper, or leather, both of which are now in general use for that purpose. It may also (after suitable preparation) be used for most of the purposes to which leather is applied: As the manufacture of Patent Leather caps, Pocket Books and for all kinds of Book-Binding. The mode of forming the Patent Leather Paper is similar to that for the manufacture of paper from Rags. The shavings being first ground or beaten to a proper consistence, are put into a suitable mould; from whence they are taken to the press.

The colour of this paper may be varied according to the quality of the shavings used or by a chemical process. It may be brought to such a degree of fineness & whiteness as to be equal to the finest writing paper.

The subscribers claim the sole privilege of using their Patent Leather Paper in the manufacture of any article to which Leather or paper is applied Witnesses
Wm P. Blagrove
I. Hammond Ephraim F. Blank [illegible]
Thomas Blank [illegible]

(2[illegible] Words)
300

(Granted February 16. 1830.)